United States Patent [19]

Takatsuki et al.

[11] Patent Number: 5,497,892
[45] Date of Patent: Mar. 12, 1996

[54] FILLER CAPS FOR INSULATED URNS AND THERMAL CONTAINERS

[75] Inventors: Toyohiko Takatsuki, Nara, Japan; Nobutaka Kiriu, Los Angeles, Calif.

[73] Assignee: Zojirushi Corporation, Japan

[21] Appl. No.: 201,178

[22] Filed: Feb. 24, 1994

[51] Int. Cl.⁶ .................................................. B65D 61/16
[52] U.S. Cl. .................... 215/309; 215/307; 220/367.1
[58] Field of Search .................................. 215/307, 309; 220/367

[56] References Cited

U.S. PATENT DOCUMENTS

| | | | |
|---|---|---|---|
| 1,819,279 | 8/1931 | Coyle . | |
| 2,682,970 | 7/1954 | Brothers, Jr. | 220/361 |
| 4,049,152 | 9/1977 | Treanor | 220/367 |
| 4,623,076 | 11/1986 | Karpal | 220/367 |
| 5,036,992 | 8/1991 | Mouchawar | 215/307 |
| 5,038,959 | 8/1991 | Patel | 220/366 |
| 5,169,602 | 12/1992 | Pang | 215/307 |

FOREIGN PATENT DOCUMENTS 1335939  7/1963  France ................................ 215/307

*Primary Examiner*—David Scherbel
*Assistant Examiner*—Terrence R. Till
*Attorney, Agent, or Firm*—Christie, Parker & Hale

[57] ABSTRACT

A filler cap for use with an insulated urn or thermal container. The filler cap comprises a filling port and a cover for receiving the filling port. When combined the cover and filling port form the filler cap which contains no moving parts when in use. A venting through the filler cap is also provided within the filler cap.

13 Claims, 3 Drawing Sheets

FILLER CAPS FOR INSULATED URNS AND THERMAL CONTAINERS

FIELD OF THE INVENTION

This invention relates to filler caps that allow filling of an insulated urn or thermal container directly from a coffee brewer, for example.

BACKGROUND OF THE INVENTION

Large urns or liquid dispensers are popular for parties, meetings and other functions where coffee or other hot or cold beverages are to be dispensed to a group of people. Most conveniently, these urns or containers are filled from a coffee maker or other liquid beverage preparer by placing the urn or container under the outlet of the beverage preparer and allowing the thermal container to be filled directly by the discharge stream from the beverage preparer. The thermal container may then be removed to the site where the beverages are to be dispensed.

Filling the thermal container from the beverage preparer is usefully achieved via a cap or other collection device to direct the liquid into the thermal container. It is preferable that this cap is kept in place on the container during the filling process, transportation and dispensing the contents of the thermal container. It is also preferable that the cap has a narrow inlet that, while allowing liquids to flow into the thermal container, will also reduce or prevent spilling and splashing as the urn is moved from the site where it is filled to the site where its contents are dispensed. Such a cap also aids in preventing splashing if the thermal container is accidentally knocked or tipped. It is also desirable that the cap assists in insulating the contents of the insulated urn or thermal container.

Another concern is that the contents of the thermal container are for human consumption and, therefore, any components coming in contact with the beverages should be capable of being thoroughly cleaned and sanitized as needed to prevent bacterial or fungal contamination of the beverage. Also, since the thermal containers may be used for different beverages at different times, it is important to be able to clean the filler cap to remove traces of beverages which have previously been used in the thermal container so that they do not contaminate subsequent beverages introduced into the thermal container. Cleaning and sanitizing is most effectively achieved if the components can be disassembled to allow all surfaces of the parts to be scrubbed.

While a narrow filling inlet in the cap is desirable for the reasons give above, the narrow inlet in the cap introduces the problem of venting air. As liquids are introduced into the container, air is displaced and must escape from the interior of the container. Also, thermal expansion of the air within the container also results in a need for venting. The venting of the air from the container must be achieved without splashing hot liquids.

It is preferable that the structure for the filling and venting functions are contained within the cap, thus avoiding the need to redesign existing thermal containers.

A number of designs have been used to incorporate a vent into a container. In some designs, such as those described in U.S. Pat. No. 1,819,279 to Coyle, U.S. Pat. No. 2,562,010 to Aitken and U.S. Pat. No. 2,682,970 to Brothers, Jr., vents are included to vent gases produced by the contents, such as butter fat, milk, cream, or hot liquids. In each of these cases the cap does not include a filling port and the vent is placed within the neck of the container, rather than within the cap.

In other designs, such as that described in U.S. Pat. No. 4,646,933 to Jurczenia et al., a vent is formed between elements on the container can and cap which cooperate to form a vent. Again this design does not include a filling port.

In another design, described in U.S. Pat. No. 4,770,318 to Earl, venting is achieved by placing a hole in the cap. In this design, no filling port is provided.

In another design described in U.S. Pat. No. 4,858,787 to Stone, a coffee pot dispenser/filler cap is described in which a vent tube is provided through the cap. A filling port is also provided which incorporates a conical cover which directs the coffee or beverage flow to a U-shaped inlet port wherein the beverage forms a seal to prevent oxidation of the contents of the container. While this design provides both a filling port and a vent, the design is very intricate making manufacture of the cap and its subsequent cleaning during use, difficult and cumbersome.

In a design described in U.S. Pat. No. 4,739,898 to Brown, a filling port is provided which incorporates a ball check valve within the neck of the filling port to prevent spilling. Venting is separately provided via a conduit which includes a ball check valve which ball is displaced when pressure builds up inside the container. This design is difficult, if not impossible, to adequately clean and the check valves are subject to sticking.

In another design described in U.S. Pat. No. 5,038,959 to Patel, a funnel-shaped inlet port includes a floatable ball to form a seal. Venting is provided by grooves located in the neck of the container around the installed portion of the filler cap in the container opening. Again this design would be difficult to adequately clean and the ball could become stuck after it has been coated with beverage.

It is desirable to provide a filler cap for use with an insulated or thermal container which incorporates a filling port and which is simple to manufacture and clean. It is also desirable that the cap has no moving parts which could become stuck during use. It is also desirable that the cap is provided with a vent to allow air to escape from the container.

SUMMARY OF THE INVENTION

A filler cap for use with an insulated urn or thermal container is described. The cap is comprised of a filling port and a cover for receiving the filling port. The filling port includes a funnel section and a delivery tube attached to the funnel section. The cover has a disc section in which there is a cylindrical section in which the filling port is inserted. The cover cylindrical section has an upper rim which forms a seat for the filling port. The cylindrical section defines a cavity in the cap around the filling port between the delivery tube and the cover. There is a notch in the rim of the cover cylindrical section and there is a hole in the cylindrical section so that the notch communicates from the cap exterior to the cavity at the top of the cap and the hole communicates from the cap exterior to the cavity at a bottom of the filler cap.

BRIEF DESCRIPTION OF THE DRAWINGS

Features, aspects and advantages of the invention will be more fully understood when considered with respect to the following detailed description, appended claims and accompanying drawings, where:

DETAILED DESCRIPTION

The present invention relates to a filler cap for filling a beverage thermal container. Venting means are contained within the filler cap, as compared to a vent between opposing surfaces of the installed cap and the container. The filler cap is easily disassembled for cleaning and no moveable parts, such as ball check valves, which move during use, are included in the filler cap.

Figure 1:
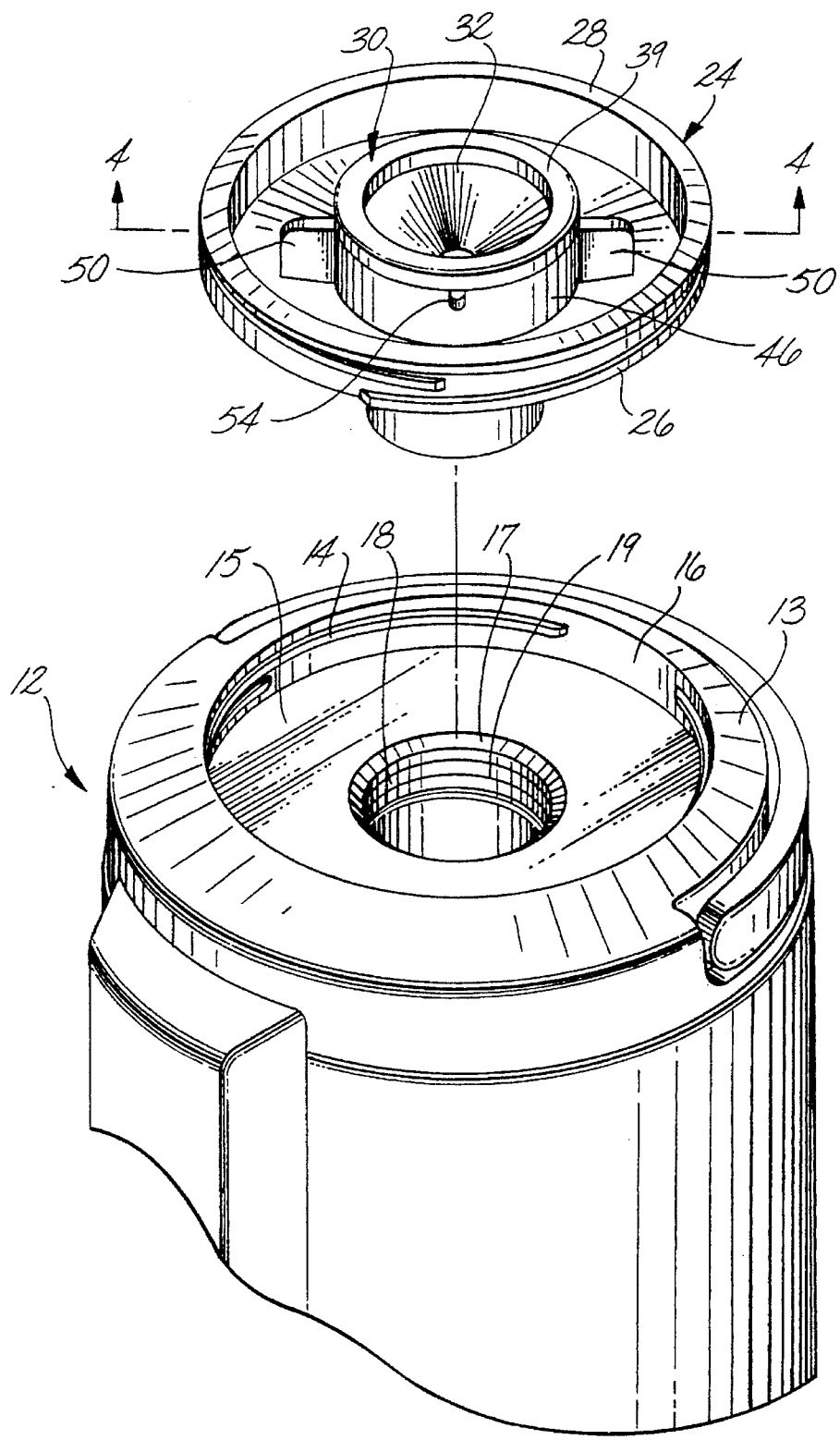
FIG. 1 is a perspective view of the filler cap of the present invention aligned with but not engaged in closure relation to an opening into an insulated container.
Figure 2:
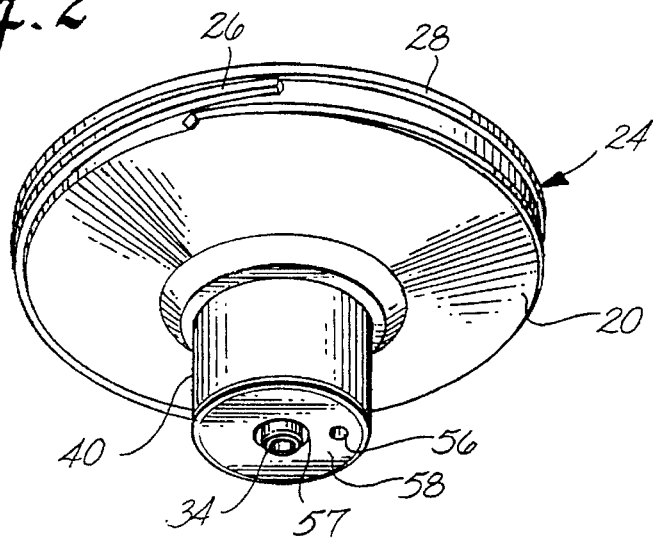
FIG. 2 is a bottom perspective view of the filler cap.
Figure 3:
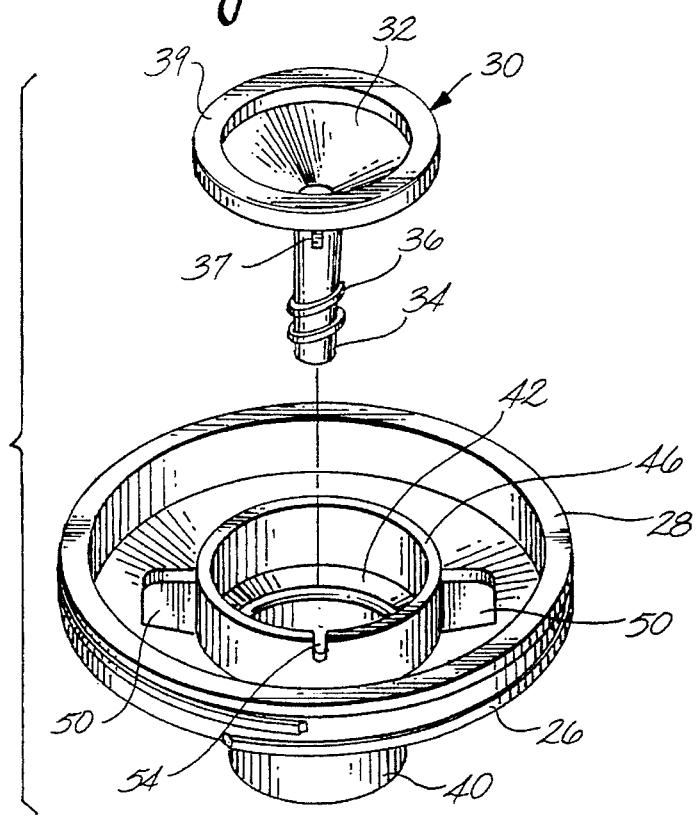
FIG. 3 is an exploded perspective top view of the filler cap.
Figure 4:
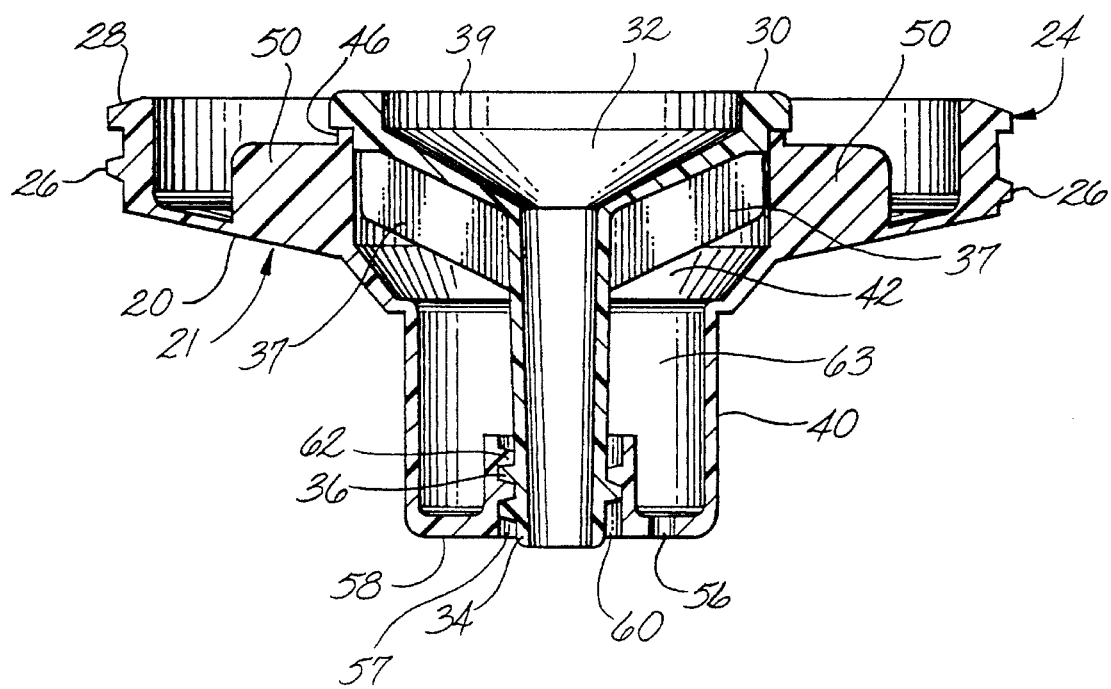
FIG. 4 is a cross-sectional view of the filler cap taken along line 4—4 in FIG. 1.

With reference to FIGS. 1–4, a thermal container 12 and a filler cap 24 are shown. A thermal container 12, suitable for use in the present invention, is an insulated or thermal type container. In the embodiment shown in FIG. 1, the upper surface of the thermal container comprises upwardly open, vertically spaced concentric faces 13 and 15 interconnected by a vertical throat wall 16 which includes preferably male threads 14. The inner face 15 defines an opening and passage 18, having a bevelled upper rim 17 and a cylindrical wall portion 19, which leads to a thermally insulated reservoir disposed within the container. In other embodiments of the present invention, the threads which form a screw coupling with cap 24 may be eliminated in favor of, e.g., a friction fit using a "rubber" stopper type insert around wall 16.

A filler cap 24 having a complementary shape to the upper surface of the thermal container is also shown. The cap is releasably engagable in the wall in the upper end of the container. The filler cap comprises a body 21 which includes a disc section 20 integrally molded to a cylindrical section 40. Cylindrical section 40 forms a plug which fits, with a close clearance, into the cylindrical wall portion 19 of the container. A rim 28 is integrally molded around the perimeter, and on the upper side of the disc section. A thread 26, matable with the thread 14 of the thermal container, is provided on the exterior of the rim. A second rim 46 is concentrically disposed within, and on the upper side, of the disc section. At the upper edge of the rim is a notch 54. In one embodiment, shown in FIG. 3, vanes 50 are disposed diametrically opposite each other around rim 46 and on the upper side of the disc section. The vanes provide purchase for screwing and unscrewing the filler cap into the thermal container.

The lower end of rim 46 defines an edge of an upwardly concave conical surface 42. Adjacent to the lower end of surface 42 and on the under side of the filler cap is a cylindrical section 40 projecting downwardly from the disc section 20. The upper side of the cylinder, i.e. at the plane of the disc section and adjacent to surface 42, is open to receive the funnel-shaped filling port element 30, described in detail below. At an end distal to the disc section, the cylinder is partially closed by wall 58. An aperture 57 is disposed within the wall. Disposed around the aperture, within the cylinder is a rim 60, the interior of which is threaded 62. A hole 56 is disposed within wall 58.

The filler cap also comprises a funnel-shaped filling port element 30. The filling port element forms a delivery tube 34 which is integrally molded to the base of a funnel bowl 32 of the port element. In one embodiment shown in FIG. 3, the delivery tube terminates in an externally threaded section 36 for attaching the delivery tube to threaded section 62 of the cylindrical section 40 of the cover in aperture 57. Disposed around the exterior of the delivery tube, and on the under side of the funnel bowl are four vanes 37. The vanes are disposed at 90° to each other and operate to center the port element on the interior of rim 46 when the port element is installed or received in the disc section of the filler cap. Disposed around the perimeter of the funnel bowl is a lip 39, the underside of which seats on rim 46 when element 30 is installed in the cover.

The diameter of the interior of the cylindrical section of the cover is greater than that of the diameter of the exterior of tube 34, such that when the funnel section is assembled with the disc section, a cavity or chamber 63 is formed between the interior of the cylindrical section and the exterior of the delivery tube. The notch 54 at the top end of the cavity and hole 56 at the bottom end of the cavity comprise vent openings which allow air to pass through the cavity from the thermal container to the outside of the cap when the filler cap is installed in the container.

For use the filler cap is disassembled, thoroughly cleaned and sanitized. The delivery tube of the funnel section is then inserted into the cylindrical section of body 21 and screwed into threads 62 until lip 39 seats on rim 64, thus attaching the filling port element to the cover. The assembled filler cap is then screwed into a thermal container to be filled and the assembled thermal container is placed under a beverage preparer. Liquid beverages are then introduced into the container through delivery tube 34. As the container is filled, air is displaced from the container and escapes through hole 56, into the cavity and then through notch 54 to the exterior of the container and filler cap, to thereby vent the interior of the thermal container. However, since hole 56 is relatively small, about 1 to 2 mm in diameter, and the base of the funnel stem is relatively small, the cap does not allow an excessive amount of heat to escape from the interior of the thermal container. When filled, the thermal container is removed to the site required for dispensing the beverage. The small diameter, about 0.5 to 1 cm, of the delivery tube (i.e., the funnel stem base) allows liquids to flow into the thermal container but inhibits splashing when the thermal container is moved or accidentally knocked. The funnel shape of the filling port also directs liquids into the thermal container and minimizes spilling of liquids. The ability to disassemble the parts of the filler cap allows cleaning and sanitizing of the filler cap for repeated use.

The preferred container for use in the present invention is a Model VYA-2200 insulated dispensing urn made by Zojirushi Corporation, Osaka, Japan and is similar in design to the container described in U.S. Pat. No. 5,038,959, which is incorporated herein by reference. The exterior configuration of the cap of the present invention is very similar to the closure cap which is a component of the urn as currently sold with the Model VYA-2200 urn.

The present invention is not to be limited to the specific design shown, which are merely illustrative. Various and numerous other arrangements may be devised by those skilled in the art without departing from the spirit and the scope of the invention. The scope of the invention is defined in the following claims.

What is claimed is:

1. A filler cap for use with an insulated urn or thermal container comprising:

a filling port comprising:

a funnel section; and a delivery tube attached to the funnel section; and a cover for receiving the filling port comprising:

a disc section;

a cylindrical section in the disc and in which the filling port is inserted, said cylindrical section having an upper rim forming a seat for the filling port and defining around the filling port a cavity in the cap between the delivery tube and the cover;

a notch in said rim; and a hole in the cylindrical section such that the notch is in communication with the cavity and the cap exterior at a top of the filler cap and the hole is in communication with the cavity and the cap exterior at a bottom of the filler cap.

2. A filler cap as recited in claim 1 wherein the delivery tube of the filling port includes a threaded section which mates with a threaded section of the cylindrical section of the cover to thereby receive and attach the filling port into the cover.

3. A filler cap as recited in claim 1 wherein the cylindrical section further comprises a wall section at an end of the cylinder distal to the disc section within which is disposed the hole in the cylindrical section.

4. A filler cap for use with an insulated urn or thermal container comprising:

a filling port;

a cover for receiving the filling port to form the filler cap wherein the filler cap contains no moving parts when in use;

a cavity formed between the cover and the filling port when the filling port is received in the cover;

a notch in communication with the cavity and an exterior of the cap at a top of the filler cap; and a hole in communication with the cavity and exterior at a bottom of the filler cap to hereby form a passage through the filler cap.

5. A filler cap for use with a thermal container comprising:

a filling port comprising:

a funnel section; and a delivery tube attached to the funnel section wherein the delivery tube includes a threaded section at an end distal to the funnel section and around an exterior of the tube;

a cover for receiving the filling port comprising:

a disc section comprising:

an exterior rim around the perimeter of the disc section;

an interior rim around a passage through the cover; and a notch in an upper side of the interior rim; and a cylindrical section attached to the disc section comprising:

a wall at an end of the cylinder distal to the disc section;

a hole in the wall of the cylinder;

an aperture in the wall of the cylinder; and a rim disposed around the aperture wherein the rim includes a threaded section for mating with the threaded section of the delivery port to attach the funnel to the cover to thereby form a cavity in the cap between the interior of the cylindrical section and the exterior of the delivery tube such that the notch is in communication with the cavity and the cap exterior at a top of the filler cap and the hole is in communication with the cavity and the cap exterior at a bottom of the filler cap.

6. A filler cap useful with an insulated liquids container comprising:

a filling port element substantially in the form of a funnel having a bowl and a hollow open-ended stem connected to a base of the bowl;

a body having an upper exterior surface and a bottom surface, the body being configured for releasable, substantially closing engagement with an opening into the container and for releasably receiving the filling port element therein, the body and the port element being cooperatively configured and arranged to define around a received position or the port element in the body a chamber having a bottom wall and an upper side portion, a first vent opening to the chamber from the exterior of the body through the chamber bottom wall and a second vent opening to the chamber through the chamber upper side portion from the upper exterior surface of the body; and releasable connection means cooperable between the prot element and the body operable for releasably securing the port element in said received position in the body in which the funnel bowl is open to the upper exterior surface of the body and the funnel stem opens through the bottom surface of the body.

7. A filler cap as recited in claim 6 wherein a passage through the port element, which comprises the bowl and the stem, is an unvalved passage.

8. A filler cap as recited in claim 7 wherein the cap and container are so cooperatively configured and arranged that, in a closure position of the cap relative to the container, fluids can flow into and out of the container essentially only via the passage and the vent openings.

9. A filler cap as recited in claim 6 wherein the container opening defines a throat into a principal volume in the container, and a portion of the body which defines substantial portions of the chamber depends into the throat in a closure position of the cap relative to the container.

10. A filler cap as recited in claim 9 wherein, in the closure position of the cap, the first vent opening is disposed substantially in the throat.

11. A filler cap as recited in claim 6 wherein the releasable connection means comprises a threaded connection between the port element and the body.

12. A filler cap as recited in claim 11 wherein the threaded connection is effective between a lower end of the stem and an aperture through the bottom wall of the chamber in the body.

13. A filler cap as recited in claim 6 wherein, in the received position of the port element in the body, the chamber is closed save for the vent openings thereinto and therefrom.

* * * * *